3,158,585
STAIN RESISTANT VINYL CHLORIDE POLYMER COMPOSITIONS CONTAINING DI(TETRAHYDROPYRAN - 2 - METHYL)PHTHALATE OR MIXED TETRAHYDROPYRAN - 2 - METHYL ALKOXYALKYL PHTHALATE PLASTICIZER

Robert G. Kelso, St. Albans, Ralph D. Eppley, South Charleston, and George H. Potter, St. Albans, W. Va., assignors to Union Carbide Corporation, a corporation of New York
No Drawing. Filed June 9, 1961, Ser. No. 115,917
5 Claims. (Cl. 260—30.4)

The invention relates to a process for improving the stain resistance of plasticized vinyl chloride polymer compositions and to the stain resistant products produced therefrom. In a particular aspect the invention relates to a process for improving the stain resistance of plasticized vinyl chloride polymer compositions which comprises incorporating into a vinyl chloride polymer composition a plasticizing amount of certain esters of phthalic acid, fully described hereinbelow, and to the stain resistant plasticized compositions produced thereby.

In many applications which employ plasticized vinyl chloride polymer, stain resistance is a desirable property. For example, light colored and clear vinyl floor tiles must resist staining from traffic, household products, from asphalt which comes from the asphalt adhesive used to lay the tile on the floor, and the like. Vinyl chloride polymers, by themselves, are resistant to staining. However, the materials employed as plasticizers in the formulations decrease the stain resistance to a greater or lesser degree, with the result that plasticized vinyl chloride polymers are frequently poor in stain resistance.

According to the present invention, it has been discovered that mixtures comprising certain esters of phthalic acid can be employed as plasticizers in vinyl chloride polymer compositions to yield compositions which are quite resistant to staining. The esters of phthalic acid which are employed in the invention are those esters in which the alcohol moieties thereof are selected from the group consisting of tetrahydropyran-2-methyl groups, alkyloxyalkylene groups having from 3 to about 8 carbon atoms, and lower alkyl groups having from 1 to 5 carbon atoms. The ester will be either a single compound (i.e.—di(tetrahydropyran-2-methyl) phthalate) or a mixture of esters in which at least 10 mole percent of the alcohol moieties of said esters are tetrahydropyran-2-methyl groups and in which at least 30 weight percent of the alcohol moieties of said ester are groups containing ether oxygen.

The vinyl chloride polymers employed in the invention are the homopolymers of vinyl chloride and the copolymers of vinyl chloride, wherein at least 70 weight percent of the monomer units are vinyl chloride. Thus, the vinyl chloride polymer can be poly(vinyl chloride), vinyl chloride-vinyl acetate copolymer, vinyl chloride-vinylidene chloride copolymer, and the like. The preferred vinyl chloride polymers are poly(vinyl chloride) and vinyl chloride-vinyl acetate copolymer wherein at least 85 weight percent of the monomer units are vinyl chloride.

The molecular weight of these polymers are normally characterized in industry by referring to their specific viscosity. The specific viscosity of a polymer is obtained by dividing the difference between the viscosity of a solution of the polymer in a suitable solvent at a given temperature and the viscosity of the solvent by the viscosity of the solvent. Unless otherwise indicated the specific viscosities of the vinyl chloride polymers employed herein were measured in a nitrobenzene solution at a concentration of 0.2 gram of polymer per 100 milliliters of nitrobenzene at 20%.

Vinyl chloride polymers having specific viscosities of from about 0.02 to about 2.0 can be employed in the invention. The preferred range of specific viscosities is from about 0.04 to about 0.8.

The esters of phthalic acid which are employed in the invention can be esters of ortho-phthalic acid, isophthalic acid, or terephthalic acid. The esters of ortho-phthalic acid are preferred.

The phthalic acid esters employed in the invention can be represented by the formula

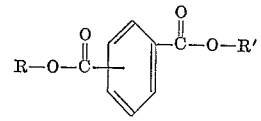

wherein R and R' (the alcohol moieties of the ester) are either tetrahydropyran-2-methyl, alkyloxyalkylene groups having from 3 to about 8 carbon atoms and alkyl groups having from 1 to 5 carbon atoms. The ester employed can either be a single compound, i.e., di(tetrahydropyran-2-methyl) phthalate, or a mixture of phthalate esters, each of which can be represented by the above formula, wherein in the total composition of the mixture, at least 10 mole percent of the alcohol moieties are tetrahydropyran-2-methyl groups and at least 30 weight percent of the alcohol moieties are groups containing ether oxygen.

The esters can be prepared by conventional methods such as by reacting phthalic anhydride with a slight stoichiometric excess of the desired alcohol or alcohols, or by an ester exchange reaction between, for example, dibutyl phthalate and the desired alcohol or alcohols.

The alcohols employed to prepare the esters are: tetrahydropyran-2-methanol, and mixtures thereof with alkyloxyalkanols and/or lower alkanols. Illustrative alcohols which can be employed in mixtures with the tetrahydropyran-2-methanol include 2-methoxyethanol, 2-ethoxyethanol, 2-propoxyethanol, 2-butoxyethanol, 2-pentoxyethanol, 2-butoxypropanol, or other alkyloxyethanols having from 3 to about 8 carbon atoms. Illustrative lower alkanols include methanol, ethanol, propanol, butanol, pentanol, and the like, or aryl-substituted alkanol such as benzyl alcohol.

A necessary requirement in the ester is that at least 10 mole percent of the alcohol moieties of said ester must be tetrahydropyran-2-methyl groups. A second requirement is that at least 30 weight percent of the alcohol moieties of said ester must be group or groups which contain an ether oxygen. The ether oxygen contemplated refers both to the oxygen found in the cyclic tetrahydropyran ring and to the oxygen found in an alkyloxyalkylene group. Thus, the ester can be di(tetrahydropyran-2-methyl) phthalate, or a mixed ester of tetrahydropyran-2-methyl and alkyloxyalkylene phthalates in which as little as 10 mole percent of the alcohol moieties present can be tetrahydropyran-2-methyl groups. The ester can also be a mixed tetrahydropyran-2-methyl alkyl phthalate in which as little as 30 weight percent of the alcohol moieties can be tetrahydropyran-2-methyl groups. The ester can also be a mixture containing tetrahydropyran-2-methyl groups, alkyloxyalklene groups, and alkyl groups, as long as the requirements stated above are met.

The preferred esters for use in the invention are di(tetrahydropyran-2-methyl) phthalate, mixed 2-butoxyethyl tetrahydropyran-2-methyl phthalates, mixed butyl tetrahydropyran-2-methyl phthalates, and mixed pentyl tetrahydropyran-2-methyl phthalates.

The phthalic acid esters are employed in the vinyl chloride polymer compositions in plasticizing amounts. The exact proportions are dependent upon many factors, such as the nature of the components of the composition and the application to which the composition is going to be employed. Therefore, the proportions will vary quite widely. As a guide, the ester is normally employed at a concentration of from about 10 phr. (parts of ester by weight per 100 parts or resin or vinyl chloride polymer) to 120 phr. and preferably from about 25 phr. to about 75 phr.

The vinyl chloride polymer compositions can also contain many other components such as pigments, fillers, vinyl chloride resin stabilizers, and the like. The nature and proportions, etc., of the other components which can be included are well-known in the art and are not within the scope of the invention.

It is preferred that conventional plasticizers not be included in the vinyl chloride polymer compositions in substantial amounts, i.e. in amounts greater than about 10 phr. It is noted here that tetrahydropyran-2-methyl esters of dibasic acids such as sebacic acid and azelaic acid are useful in small amounts to improve low temperature properties of the vinyl chloride polymer compositions.

The stain resistant plasticized vinyl chloride polymer compositions of the invention can be prepared by conventional methods which are well-known in the plastics art.

The outstanding characteristic of the compositions of the invention is their high degree of resistance to staining by asphalt, household products, rubber shoe heels, and the like.

The actual performance of a vinyl chloride polymer composition in resistance to staining shows a high degree of correlation to the performance of the particular plasticizer employed in the asphalt stain test. The asphalt stain test is conducted according to the following procedure:

ASPHALT STAIN TEST

A 6-inch test tube 20 mm. in diameter is half-filled with the plasticizer to be tested, and a ⅜-inch square piece of asphalt-impregnated paper immersed in it. The tube is stoppered and allowed to stand one week. After shaking, the color which develops in the liquid is measured by comparison with Gardner (1933) color standards, and is reported as the color increase in Gardner units. The procedure employed in preparing the Gardner color standards is disclosed in ASTM D-154-58. Color comparisons are made visually looking through equal thicknesses of liquid, backlighted.

The esters employed in the present invention show a color increase of less than about 5 Gardner (1933) units when subjected to the asphalt stain test.

The stain resistant plasticized vinyl chloride polymer compositions of the invention are highly useful in the production of floor tiles and other articles of commerce which are produced from vinyl chloride polymers.

The following examples serve to illustrate the practice of the invention.

Example 1

PREPARATION OF DI(TETRAHYDROPYRAN-2-METHYL) PHTHALATE

A charge of 741 grams (5.0 moles) of phthalic anhydride, 1394 grams (12 moles) of tetrahydropyran-2-methanol, 2.2 grams of ortho-toluenesulfonic acid, and 200 grams of toluene are placed in a 3-liter flask equipped with an electric heating mantle, thermowell, gas ebullator, 30 x 300 mm. still-column packed with 8 by 10 millimeter glass rings, a condensing still head equipped with a water trap and glass receivers. The system is connected to a vacuum pump. The mixture is heated to 175° C. at 200 mm. Hg absolute pressure at which point refluxing takes place; water of reaction is removed as the lower layer from the heterogeneous toluene-water azeotrope condensate from the water trap in the still head. After a reaction time of 13.5 hours, during which the reaction temperature is maintained just below 200° C., 96 grams of lower layer are removed from the water trap. (Theoretical: 90 grams of water; the water layer probably includes some dissolved tetrahydropyran-2-methanol). The residual acidity of the reaction mixture is determined to be 0.276 percent by weight calculated as phthalic acid. The crude reaction mixture is stirred for 30 minutes with about 500 ml. of 4 percent by weight aqueous sodium hydroxide solution; the layers are allowed to separate, and the organic layer is removed and washed twice with about 800-ml. volumes of water. The crude product, weighing 1968 grams, is placed in a flash evaporator and distilled under high vacuum. Water and toluene are removed up to a vapor temperature of 55° C. and 15 mm. Hg pressure; excess tetrahydropyran-2-methanol is removed to a vapor temperature of 78° C. at 0.3 mm. Hg absolute pressure; and 1625 grams of di(tetrahydropyran-2-methyl) phthalate is distilled at 222° C. vapor temperature at 0.3 to 0.5 mm. Hg absolute pressure. The distilled ester, having a residual acidity of 0.19 percent by weight calculated as phthalic acid, is stirred at 80° to 90° C. for one-half hour with a mixture consisting of 1 percent by weight of finely divided calcined magnesia, 1 percent powdered activated carbon, and 2 percent by weight diatomaceous earth (Filter Cel), and then filtered. A refined ester is recovered weighing 1300 grams.

Example 2

PREPARATION OF MIXED 2-BUTOXYETHYL TETRAHYDROPYRAN-2-METHYL PHTHALATES

In the reaction vessel described in Example 1, 740 grams (5.0 moles) of phthalic anhydride, 828 grams (7.0 moles) of 2-butoxyethanol, 383 grams (5.0 moles) of tetrahydropyran-2-methanol, 100 grams of benzene, and 2 grams of ortho-toluenesulfonic acid are reacted at a temperature of 173° to 184° C. at atmospheric pressure for 19.5 hours. Water of reaction is removed as the lower layer of the condensed benzene-water azeotrope from the water trap in the still head. 2038 grams of crude product is obtained having a residual acidity of 0.14 weight percent calculated as phthalic anhydride. The product is neutralized with aqueous sodium hydroxide and water-washed as described in Example 1, the benzene, water and unreacted alcohols removed by vacuum distillation to a temperature of 215° C. at 0.5 mm. Hg absolute pressure, and the residue product further refined by stirring with activated carbon, calcined magnesia, and diatomaceous earth as described in Example 1.

Example 3

EXAMPLE OF A TRANSESTERIFICATION REACTION TO PREPARE MIXED BUTYL TETRAHYDROPYRAN-2-METHYL PHTHALATE

The esterification equipment described in Example 1 is modified by replacing the still head with one not equipped with a water trap. A mixture of 5 moles of dibutyl phthalate, 5.5 moles of tetrahydropyran-2-methanol, and 1.7 grams of sodium methylate is placed in the reaction flask and heated to a temperature of 189° C. Butanol is removed overhead as it is formed. The reaction temperature is maintained below 200° C. for the major portion of the reaction by applying vacuum. The reaction requires 24.25 hours to complete. The crude ester is refined by distillation. A small forefraction is obtained up to a vapor temperature of 185° C. at 0.1 mm. Hg. absolute pressure, and the product mixed ester is distilled in a vapor temperature range of 188° to 226° C. The distilled ester is further refined by contacting with calcined magnesia, and activated carbon as described in Example 1.

The esters prepared in Examples 1 to 3, and other esters which are prepared by analogous procedures, were evaluated as plasticizers for vinyl chloride polymers by the following procedures:

Test plaques were prepared by standard procedures from formulations comprising 50 parts by weight of the ester to be evaluated and 100 parts by weight of a vinyl chloride homopolymer having a specific viscosity of about 0.18, 2 parts dibasic lead phosphate, and 1 part dibasic lead stearate. The plaques were then tested for the properties listed below.

Hardness—Durometer "A," ASTM D–676–49T.
$T_4$, ° C.—Temperature at which a stiffness of 10,000 p.s.i. is obtained according to ASTM D–1043–51.
$T_B$, ° C.—Brittle temperature; ASTM D–746–52T.
Oil extraction, $k$—Weight loss to mineral oil at 50° C. of a 20-mil plaque containing the specified concentration of ester (50 phr.) for sufficient time to lose 3–10 percent of its weight is measured.

$$k = \frac{W_1 - W_2}{a\sqrt{t}}$$

$W_1$=Initial weight
$W_2$=Final weight
$a$=Total area of plaque
$t$=Time immersed in mineral oil.

Water extraction—Procedure of ASTM Bulletin No. 183, July, 1952.
Volatile loss, percent—Measured for 24-hour exposure to temperature of 70° C.—ASTM 1203–52T.
Minimum flux temperature, ° C.—Equal parts by weight of the ester to be evaluated and a dispersion grade vinyl chloride homopolymer having a specific viscosity of about 0.25 were stirred together in a beaker to form a fluid homogeneous mixture. A narrow (about ¼ inch) strip of this mixture was then poured along a temperature gradient bar whose temperature had previously been adjusted so that the hot end was about 150° C. and the cool end about 50° C. The temperature gradient bar was fabricated from mild steel and had the following dimensions: 1-inch thick, 4-inches wide, and 18-inches long. One end was supported on a hot plate fitted with a thermostatic temperature control, and the other supported by any convenient method, preferably an unheated metallic surface which will act as a heat sink. The plastisol strip was allowed to remain on the bar for exactly 20 minutes and stripped off from the hot end pulling at an angle of about 90° with the bar to the point of breaking. The temperature at this point, measured with a contact pyrometer, was recorded as the minimum flux temperature. Below this point the temperature is too low for adequate fluxing of the ester with the resin to form a continuous strip.

In the following Tables I and II, properties of the esters employed in the invention (Examples 1 through 7) are compared with properties of other esters (Examples 8 through 13). In Table I, the esters are identified and certain of their physical properties are noted; in Table II, their performance as plasticizers for vinyl chloride polymers is set forth.

TABLE I

*Esters of Tetrahydropyran-2-Methanol Physical and Analytical Data*

| Example No. | Compound | Total Alcohol, moles | Alcohol, mole ratio (a) | Wt. percent Etheric Alcohol (d) | Dibasic Acid, moles | Specific Gravity, 20/15.6° C. | Acidity, meq./gm. |
|---|---|---|---|---|---|---|---|
| 1 | Di(tetrahydropyran-2-methyl) phthalate | 12 | | 100 | 5 | 1.170 | 0.006 |
| 2 | 2-Butoxyethyl tetrahydropyran-2-methyl phthalate | 12 | 70/30 | 100 | 3.3 | 1.099 | Nil |
| 3 | n-Butyl tetrahydropyran-2-methyl phthalate | b5 | 40/60 | 71.5 | c5.5 | 1.142 | 0.095 |
| 4 | n-Pentyl tetrahydropyran-2-methyl phthalate | 21 | 50/50 | 58 | 10 | 1.110 | Nil |
| 5 | 2-Butoxyethyl tetrahydropyran-2-methyl phthalate | 10.3 | 30/70 | 100 | 5 | 1.139 | Nil |
| 6 | n-Butyl tetrahydropyran-2-methyl phthalate | 21.4 | 75/25 | 36.4 | 10 | 1.087 | Nil |
| 7 | n-Pentyl tetrahydropyran-2-methyl phthalate | 21 | 60/40 | 49 | 10 | 1.088 | Nil |
| 8 | n-Pentyl tetrahydropyran-2-methyl phthalate | 17.12 | 75/25 | 28 | 8 | 1.056 | Nil |
| 9 | 2-Ethylhexyl tetrahydropyran-2-methyl phthalate | 16.98 | 50/50 | 46.5 | 8 | 1.025 | Nil |
| 10 | 2-Ethylhexyl tetrahydropyran-2-methyl phthalate | 16.8 | 60/40 | 34.7 | 8 | 1.050 | Nil |
| 11 | Di(tetrahydropyran-2-methyl) adipate | 11 | | 100 | 5 | 1.099 | Nil |
| 12 | 2-Ethylhexyl tetrahydropyran-2-methyl adipate | 11 | 40/60 | 56.5 | 5 | 1.160 | Nil |
| 13 | 2-Ethylhexyl tetrahydropyran-2-methyl azelate | 7.67 | 40/60 | 56.5 | 3.5 | 0.995 | Nil | a Mole ratio of other alcohol to tetrahydropyran-2-methanol charged to the reaction.
b This run was made by transesterification of tetrahydropyran-2-methanol with dibutyl phthalate.
c Moles of dibutyl phthalate.
d Weight percent of alcohol moieties containing ether oxygen.

TABLE II

*Plasticizer Performance Data at 50 phr. Concentration in Vinyl Chloride Resin* a

| Example No. | Compound | Charged alcohol, mole ratio | Durometer "A" hardness | $T_4$, ° C. | $T_B$, ° C. | Volatile loss, percent | Extraction Oil, K | Extraction Water, percent | Sweat out | Minimum flux temp., ° C. | Asphalt stain rating b |
|---|---|---|---|---|---|---|---|---|---|---|---|
| 1 | Di(tetrahydropyran-2-methyl phthalate | | 93 | 34 | 18 | 0.3 | 0.2 | 1.6 | None | 76 | 1 |
| 2 | 2-Butoxyethyl tetrahydropyran-2-methyl phthalate | 70/30 | 73 | 12 | 8 | 0.5 | 1.4 | 4.3 | None | 91 | 1 |
| 3 | n-Butyl tetrahydropyran-2-methyl phthalate | 40/60 | 85 | 27 | 12 | 1.1 | 0.4 | 2.9 | None | 74 | 2.5 |
| 4 | n-Pentyl tetrahydropyran-2-methyl phthalate | 50/50 | 75 | 14 | 0 | 1.3 | 0.8 | 3.3 | None | 75 | 1.5 |
| 5 | 2-Butoxyethyl tetrahydropyran-2-methyl phthalate | 30/70 | 82 | 24 | 14 | 0.3 | 0.4 | 2.9 | None | 77 | 1 |
| 6 | n-Butyl tetrahydropyran-2-methyl phthalate | 75/25 | 72 | 9 | −12 | 5.5 | 1.8 | 2.8 | None | 70 | 3.0 |
| 7 | n-Pentyl tetrahydropyran-2-methyl phthalate | 59/41 | 71 | 16 | 2 | 2.1 | 1.2 | 2.9 | None | 74 | 3.0 |
| 8 | n-Pentyl tetrahydropyran-2-methyl phthalate | 78/22 | 71 | 8 | −10 | 3.6 | 2.4 | 2.0 | None | 71 | 5.0 |
| 9 | 2-Ethylhexyl tetrahydropyran-2-methyl phthalate | 50/50 | 81 | 20 | 10 | 0.4 | 0.6 | 2.8 | None | 81 | 7.0 |
| 10 | 2-Ethylhexyl tetrahydropyran-2-methyl phthalate | 62/38 | 76 | 16 | −4 | 0.7 | 1.0 | 1.5 | None | 80 | 6 |
| 11 | Di(tetrahydropyran-2,methyl) adipate | | 72 | 8 | −4 | 1.2 | 2.6 | 8.3 | None | 68 | 6 |
| 12 | 2-Ethylhexyl tetrahydropyran-2-methyl adipate | 40/60 | 69 | −9 | −28 | 1.2 | 5.1 | 8.0 | None | 80 | 9 |
| 13 | 2-Ethylhexyl tetrahydropyran-2-methyl azelate | 40/60 | 69 | −11 | −38 | 0.9 | 5.8 | 7.5 | None | 66 | 10 | a 50 parts ester per one hundred parts poly(vinyl chloride) by weight.
b Gardner (1933) Units Color Increase of Ester.

What is claimed is:

1. A stain resistant plasticized vinyl chloride polymer composition which comprises a vinyl chloride polymer having a reduced viscosity in the range of from 0.02 to 2.0, determined in a solution of 0.2 gram of polymer per 100 milliliters of nitrobenzene at 20° C., and a plasticizing amount of a mixture of esters of phthalic acid wherein the alcohol moieties of said esters are selected from the group consisting of tetrahydropyran-2-methyl, alkyloxyalkylene groups having from three to eight carbon atoms, and lower alkyl groups having from one to five carbon atoms; provided that at least 10 mole percent of the alcohol moieties of said esters are tetrahydropyran-2-methyl groups, and further provided that at least 30 weight percent of the alcohol moieties are groups containing ether oxygen.

2. A strain resistant plasticized vinyl chloride polymer composition which comprises a vinyl chloride polymer having a reduced viscosity in the range of from 0.02 to 2.0, determined in a solution of 0.2 gram of polymer per 100 milliliters of nitrobenzene at 20° C., and a plasticizing amount of di(tetrahydropyran-2-methyl) phthalate.

3. A stain resistant plasticized vinyl chloride polymer composition which comprises a vinyl chloride polymer having a reduced viscosity in the range of from 0.02 to 2.0, determined in a solution of 0.2 gram of polymer per 100 milliliters of nitrobenzene at 20° C., and a plasticizing amount of a mixed butoxyethyl tetrahydropyran-2-methyl phthalate ester wherein at least 10 mole percent of the alcohol moieties of said ester is tetrahydropyran-2-methyl.

4. A stain resistant plasticized vinyl chloride polymer composition which comprises a vinyl chloride polymer having a reduced viscosity in the range of from 0.02 to 2.0, determined in a solution of 0.2 gram of polymer per 100 milliliters of nitrobenzene at 20° C., and a plasticizing amount of a mixed butyl tetrahydropyran-2-methyl phthalate ester wherein at least 30 weight percent of the alcohol moieties of said ester is tetrahydropyran-2-methyl.

5. A stain resistant plasticized vinyl chloride polymer composition which comprises a vinyl chloride polymer having a reduced viscosity in the range of from 0.02 to 2.0, determined in a solution of 0.2 gram of polymer per 100 milliliters of nitrobenzene at 20° C., and a plasticizing amount of a mixed pentyl tetrahydropyran-2-methyl phthalate ester wherein at least 30 weight percent of the alcohol moieties of said ester is tetrahydropyran-2-methyl.

References Cited in the file of this patent

UNITED STATES PATENTS

| | | |
|---|---|---|
| 2,574,444 | Whetstone | Nov. 6, 1951 |
| 2,862,959 | Patrick et al. | Dec. 2, 1958 |
| 2,897,176 | Rocky et al. | July 28, 1959 |
| 3,020,253 | Lukes | Feb. 6, 1962 |

FOREIGN PATENTS

| | | |
|---|---|---|
| 1,227,629 | France | Mar. 7, 1960 |